(12) United States Patent
Bannon

(10) Patent No.: US 11,903,364 B2
(45) Date of Patent: Feb. 20, 2024

(54) PENNING SYSTEM

(71) Applicant: ICM AUSTRALIA PTY LTD, Melbourne (AU)

(72) Inventor: Michael Bannon, Melbourne (AU)

(73) Assignee: ICM AUSTRALIA PTY LTD, Melbourne (AU)

( * ) Notice: Subject to any disclaimer, the term of this patent is extended or adjusted under 35 U.S.C. 154(b) by 0 days.

(21) Appl. No.: 17/764,046

(22) PCT Filed: Apr. 29, 2020

(86) PCT No.: PCT/AU2020/050421
§ 371 (c)(1),
(2) Date: Mar. 25, 2022

(87) PCT Pub. No.: WO2021/072478
PCT Pub. Date: Apr. 22, 2021

(65) Prior Publication Data
US 2022/0346345 A1 Nov. 3, 2022

(30) Foreign Application Priority Data
Oct. 18, 2019 (AU) .................................. 2019250258

(51) Int. Cl.
*A01K 1/00* (2006.01)
*A01K 1/01* (2006.01)

(52) U.S. Cl.
CPC .......... *A01K 1/0029* (2013.01); *A01K 1/0011* (2013.01); *A01K 1/0088* (2013.01)

(58) Field of Classification Search
CPC .... A01K 1/011; A01K 1/0029; A01K 1/0088; A01K 1/0011

USPC ......................... 119/502, 504, 510, 513, 514
See application file for complete search history.

(56) References Cited

U.S. PATENT DOCUMENTS

| | | | |
|---|---|---|---|
| 2,835,223 A | 5/1958 | Erickson | |
| 3,203,033 A | 8/1965 | George | |
| 3,804,065 A | 4/1974 | Coates | |
| 3,921,585 A * | 11/1975 | Hall | B60P 3/04 119/512 |
| 4,919,080 A * | 4/1990 | Balsbaugh | A01K 1/02 119/524 |

(Continued)

FOREIGN PATENT DOCUMENTS

| | | |
|---|---|---|
| EP | 0867111 A1 | 9/1998 |
| GB | 189712699 A | 3/1898 |
| GB | 2149284 A | 6/1985 |

OTHER PUBLICATIONS

International Search Report dated Jun. 15, 2020 for corresponding International Application No. PCT/AU2020/050421, dated Apr. 29, 2020.

(Continued)

*Primary Examiner* — David J Parsley
(74) *Attorney, Agent, or Firm* — David D. Brush; Westman, Champlin & Koehler, P.A.

(57) ABSTRACT

A penning system including partitions and barriers movable from a deployed configuration, in which the partitions partition an area over a floor into spaces and in which the barriers enclose the spaces to define pens for penning animals, to a collapsed configuration, wherein the partitions and barriers are collapsed for cleaning the floor.

19 Claims, 4 Drawing Sheets

(56) References Cited

U.S. PATENT DOCUMENTS

| | | | |
|---|---|---|---|
| 4,924,813 A * | 5/1990 | Bixler | A01K 3/001 |
| | | | 119/512 |
| 5,115,763 A * | 5/1992 | Wilson | A01K 3/001 |
| | | | 119/512 |
| D329,716 S | 9/1992 | Gismondi | |
| 5,381,757 A * | 1/1995 | Putney | A01K 3/001 |
| | | | 119/512 |
| 6,467,433 B1 * | 10/2002 | Stanton | B60P 3/04 |
| | | | 119/512 |
| 6,499,435 B2 * | 12/2002 | Markham | A01K 3/001 |
| | | | 119/512 |
| 6,691,644 B1 * | 2/2004 | Anderson | A01K 1/0088 |
| | | | 119/515 |
| 6,729,267 B2 * | 5/2004 | Campbell | B60P 3/04 |
| | | | 119/519 |
| 7,958,616 B2 * | 6/2011 | Meyer, Jr. | A01K 3/001 |
| | | | 119/514 |
| 8,438,995 B1 | 5/2013 | Donahue et al. | |
| 9,844,204 B2 * | 12/2017 | Schwartz | E05D 3/10 |
| 9,968,071 B1 | 5/2018 | Smith | |
| 2013/0192532 A1 | 8/2013 | Ganahl | |

OTHER PUBLICATIONS

Written Opinion of the International Searching Authority dated Jun. 15, 2020 for corresponding International Application No. PCT/AU2020/050421, filed Apr. 29, 2020.

* cited by examiner

PENNING SYSTEM

CROSS-REFERENCE TO RELATED APPLICATIONS

This Application is a Section 371 National Stage Application of International Application No. PCT/AU2020/050421, filed Apr. 29, 2020, which is incorporated by reference in its entirety and published as WO 2021/072478 A1 on Apr. 22, 2021, in English.

FIELD

The invention relates to penning animals. The invention will be described with respect to penning calves by way of example only. Various examples of the technologies disclosed herein may be applied to penning other animals.

BACKGROUND

In the dairy industry, it is customary to group and pen calves in weekly batches, e.g. calves 0 days to 6 days old are kept together in one pen, whilst calves 7 days to 13 days old are kept together in another pen. Penning the calves in this way enables them to be closely monitored and more carefully cared for during their early days.

Young calves grow rapidly. Typically, a 6 day old calf is significantly bigger and stronger than a newborn calf, and unfortunately bullying can and does occur within the pens. Utilising more pens to separately pen narrower age-ranges of calves would go some way to addressing this problem. On the other hand, numerous small pens are typically more difficult to clean than a single large pen of equivalent overall size.

With the foregoing in mind, the present invention aims to provide improvements in and for penning, and/or in and for maintaining animal-containment facilities, or at least to provide a useful alternative for people concerned with such things.

SUMMARY

One aspect of the invention provides a penning system for an area along an elongate barrier and over a floor, the system comprising
movable-barriers;
partitions configured to carry the movable-barriers; and
partition-mountings configured to mount the partitions to swing about the partition-mountings;
wherein the partitions and the movable-barriers are movable
from a deployed configuration
in which the partitions extend outwardly from the partition-mountings and the elongate-barrier to partition the area into spaces, and
the movable-barriers enclose the spaces to define pens for penning animals;
to a collapsed configuration wherein the partitions and movable-barriers are collapsed for cleaning the floor; and
the pivotal-mountings are configured to cantilever the partitions to hold the partitions and the movable-barriers clear of bedding material and debris on the floor.
The system may comprise supports co-operable with the partitions in the deployed configuration to fix the partitions relative to the elongate-barrier.

Preferably each respective barrier has a barrier-mounting to enable the respective barrier to swing relative to a respective one of the partitions adjacent the respective barrier. Most preferably each respective barrier is releasably connectable to another one of the partitions adjacent the respective barrier.

The animals may be calves.

Another aspect of the invention provides an installed penning system;
bulk material covering at least most of a floor within an area along an elongate barrier;
the penning system comprising partitions and movable barriers carried by the partitions;
wherein the penning system is collapsible
from a deployed configuration in which the partitions extend away from the elongate barrier to partition the area into spaces and the movable-barriers enclose the spaces to define pens for penning animals
to a collapsed configuration in which the partitions and movable-barriers are collapsed for cleaning the floor; and
the partitions are mounted to swing towards the elongate barrier as the system is collapsed from the deployed configuration to the collapsed configuration; and
the partitions and movable barriers are suspended above the floor to move over the bulk material as the system is collapsed from the deployed configuration to the collapsed configuration.

Preferably an average depth, of bulk material over the area, is at least 25 mm, or more preferably at least 50 mm. The bulk material may comprise one or more of sand and wood-particulate (e.g. wood shavings). The partitions may be cantilevered and thereby suspended above the floor.

Another aspect of the invention provides an animal-containment facility comprising the system.

The facility may comprise a first system and a second system. The first system may be positioned substantially opposite the second system.

Another aspect of the invention provides a method, of maintaining the facility, comprising
transferring the animals from the first system to the second system;
collapsing the partitions and the barriers of the first system to the collapsed configuration; and
cleaning the floor in a vicinity of the first system.

Another aspect of the invention provides a method of maintaining an animal-containment facility;
the facility comprising the system;
the method comprising
removing the animals from the pens;
collapsing the partitions and the barriers to the collapsed configuration; and
cleaning the floor.

The cleaning may comprise removing bedding material.

DESCRIPTION OF EMBODIMENTS

Figure 1:
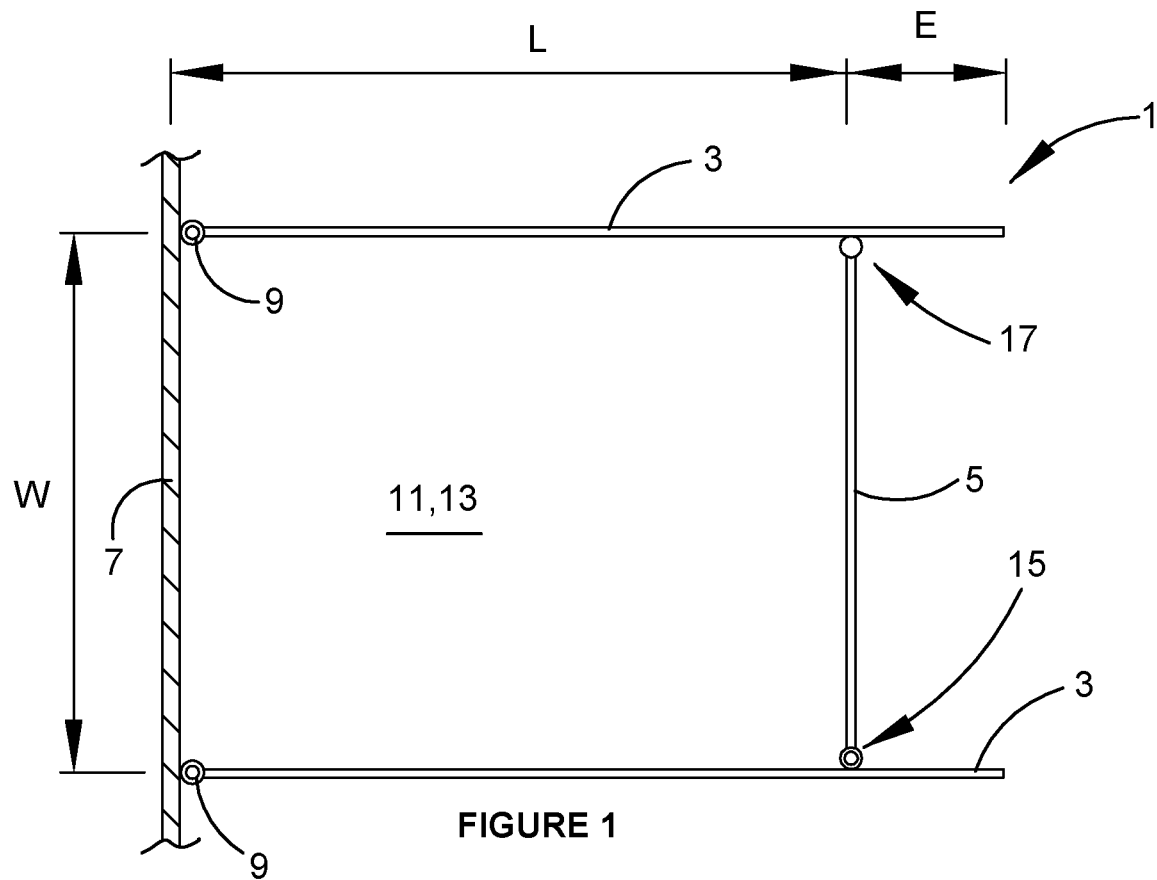
FIG. 1 is a plan view of one pen of a penning system.

The penning system 1 comprises partitions 3 and barriers 5. The system 1 is mounted along an elongate barrier in the form of a wall 7 in the form of an exterior wall of the barn 8. The system 1 comprises mountings 9 by which the partitions 3 are mounted to swing relative to the wall 7. In this example, the mountings 9 are pivotal mountings by which the partitions 3 are mounted to pivot, about upright axes, relative to the wall 7.

When the partitions 3 and barriers 5 are in their deployed configuration, the partitions 3 extend outwards from, and in this case substantially at right angles to, the wall 7 to partition an elongate area running along the wall 7 into individual spaces 11. Each barrier 5 is spaced from the wall 7 and mutually connects an adjacent two partitions 3 to enclose a space 11 and thereby define the pen 13. In this example, when in its deployed configuration, the barrier 5 is substantially parallel to the wall 7.

Figure 3:
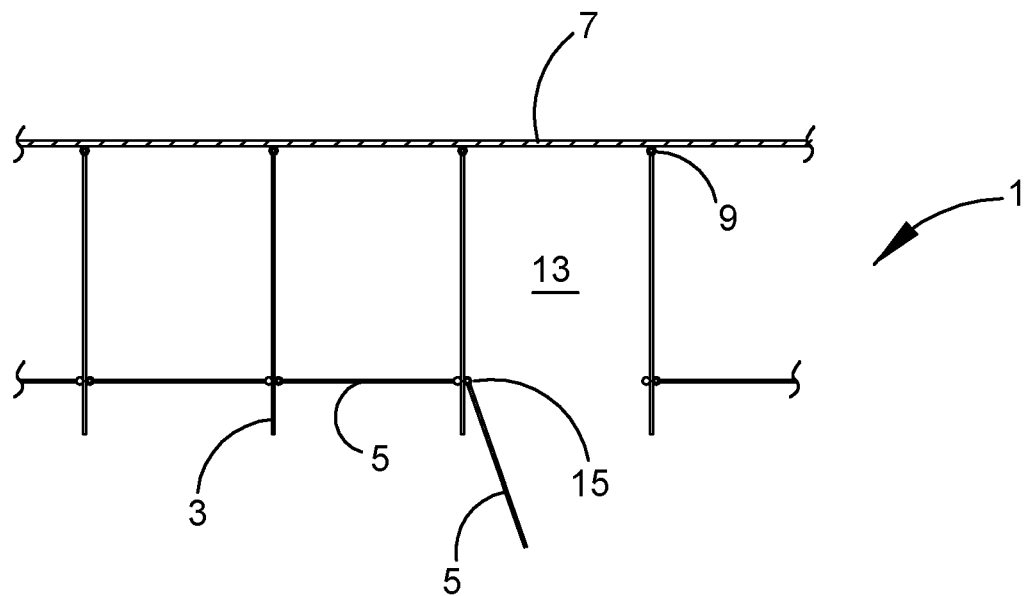
FIG. 3 is a plan view of a penning system.

The barrier 5 is mounted to swing relative to one of the partitions 3 via mounting 15. In this example, the mounting 15 is a pivotal mounting by which the barrier 5 is mounted to pivot about an upright axis relative to the one of the partitions 3. Other modes of connection such as flexible elements or other more elaborate hinges may be employed to enable the barrier to swing relative to the one of the partitions 3. At a second barrier connection 17, the barrier 5 is releasably connected to the other of the adjacent partitions 3. The barrier mounting 17 enables one end of the barrier 5 to be released so that the barrier 5 is a swing gate. The barrier 5 can be pivoted about the mounting 15 to open the pen 13 as suggested in FIG. 3. Thus the pens are individually accessible.

Preferably the floor is a hard floor that is durable and easy to clean. Concrete is a suitable material. Preferably the floor is covered with a bed of bulk material for the comfort and health of the animals. Bulk materials such as sand and wood shavings may be laid down. The bedding material may be selected based on the climate. In south-eastern Australia, sand is a preferred option because it tends to be less attractive to flies; in summer, a bed substantially consisting of sand might be provided to help keep the animals cool, whilst in winter the sand might be top-dressed with wood shavings to provide a warmer bed. Of course, other relatively warmer materials such as straw might be employed as a top-dressing over other relatively cooler materials.

Another advantage of the smaller (e.g. individually-sized) pens is the ability to top dress the bedding material from time to time without opening the pens.

Advantageously, manure can be covered over with bedding material projected into the pen by any convenient means, e.g. a few shovelfuls of sand or sawdust could be thrown in through the front gate of the pen. This ability to top-dress provides an easy (i.e. inexpensive) means to improve animal comfort.

Figure 2:
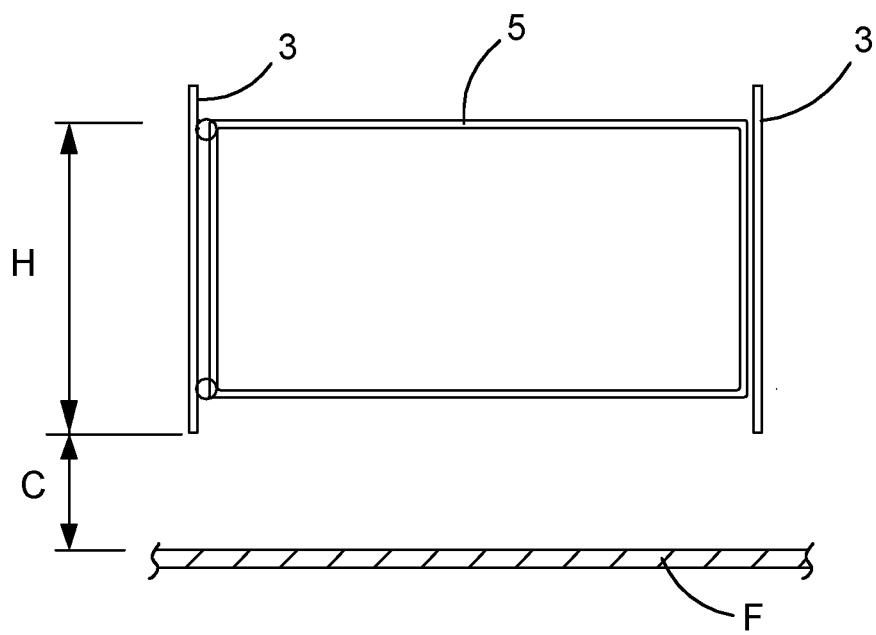
FIG. 2 is an elevation of the pen of FIG. 1.

The partitions 3 are cantilevered from their mountings 9 (or otherwise suspended above the floor) whereby the partitions 3 and barrier 5 are held clear, by clearance C, of the floor F (see FIG. 2). In this way, the components 3, 5 clear the bedding material and debris on the floor and there are no wheels running along the floor to get stuck in the bedding material. Preferably the clearance is at least 100 mm, e.g. at least 200 mm.

In this example, to suit genetically-larger calves and about 100 mm deep bedding, the clearance is in the vicinity of 300 mm and each barrier member 5 is in the vicinity of 650 mm high (H), or more preferably about 800 mm high, over and above the clearance C (or put another way, the top of the barrier is preferably about 1,100 mm above the floor).

Figure 7:
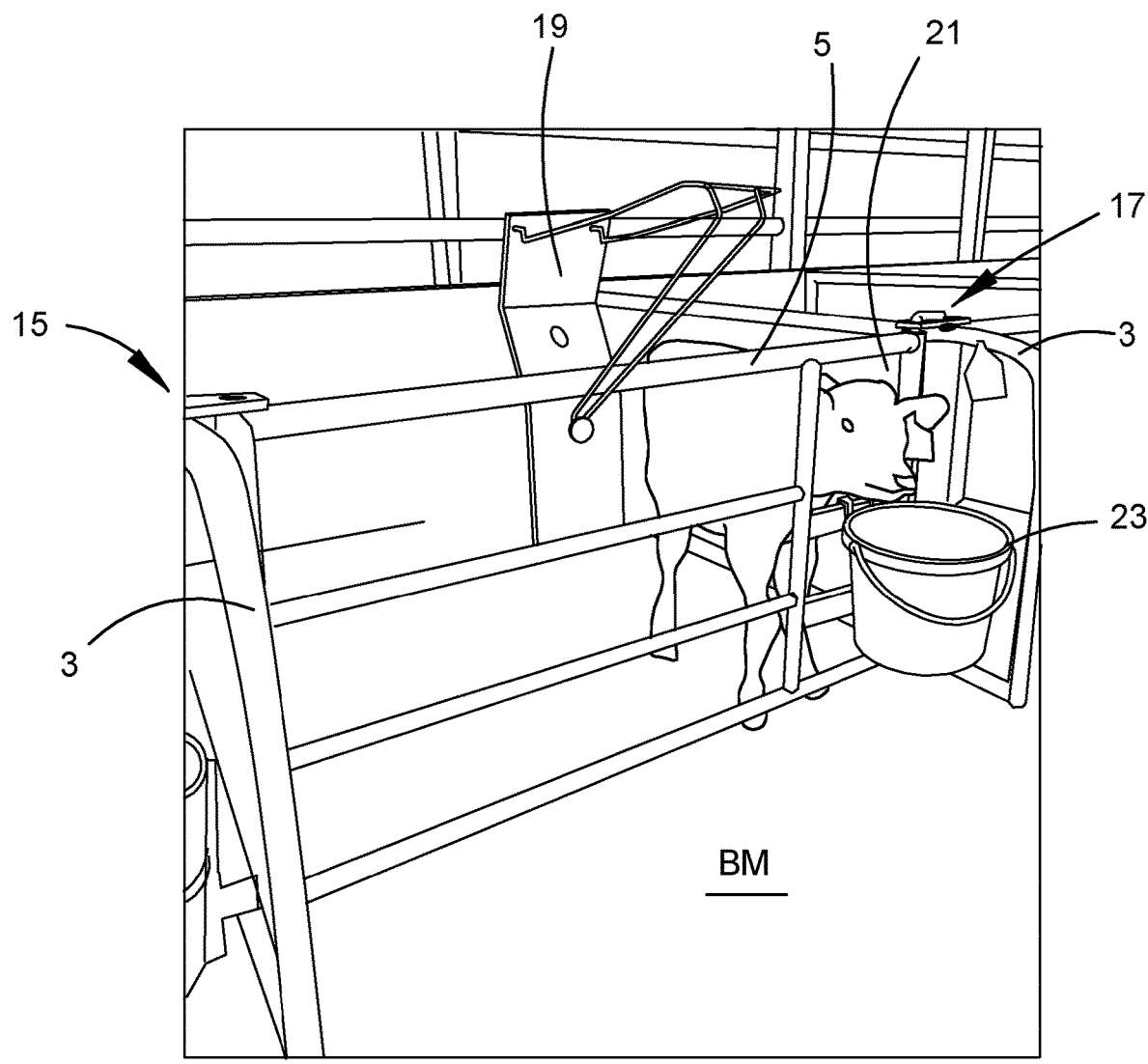
FIG. 7 is a perspective view of the pen of FIG. 1 in use.

FIG. 7 illustrates the barrier mounting 15, 17 in more detail. The mounting 15 is a rudimentary hinge. The mounting 17 comprises a horizontal flange projecting laterally from the side of one of the partitions 3. The flange has a through-hole positioned to sit in register with the open end of a tubular upright of the barrier 5 when the barrier 5 is closed. The long arm of an L-shaped member is dropped through the hole and into the tubular upright to restrain the barrier. The short arm of the L-shaped member stops the bolt falling through the hole and provides a convenient handle by which the bolt can be lifted when it is time to open the gate.

In this example, each partition 5 has a tubular steel frame spanned by opaque sheet material, which material takes the form of galvanised steel in this example.

FIG. 7 illustrates a preferred form of the barrier 5 in more detail. The barrier 5 is predominantly made up of a weldment of tubular elements and also carries a drink holder 19 for holding a drink bottle and presenting the teat of the bottle to the calf. Barrier 5 further defines a window 21 associated with a feed bucket arranged so that the feed bucket sits on the exterior of the barrier (whereat it is conveniently accessible for refilling and cleaning, etc) and is positioned for the calf to access the bucket via the window 21.

Figure 6:
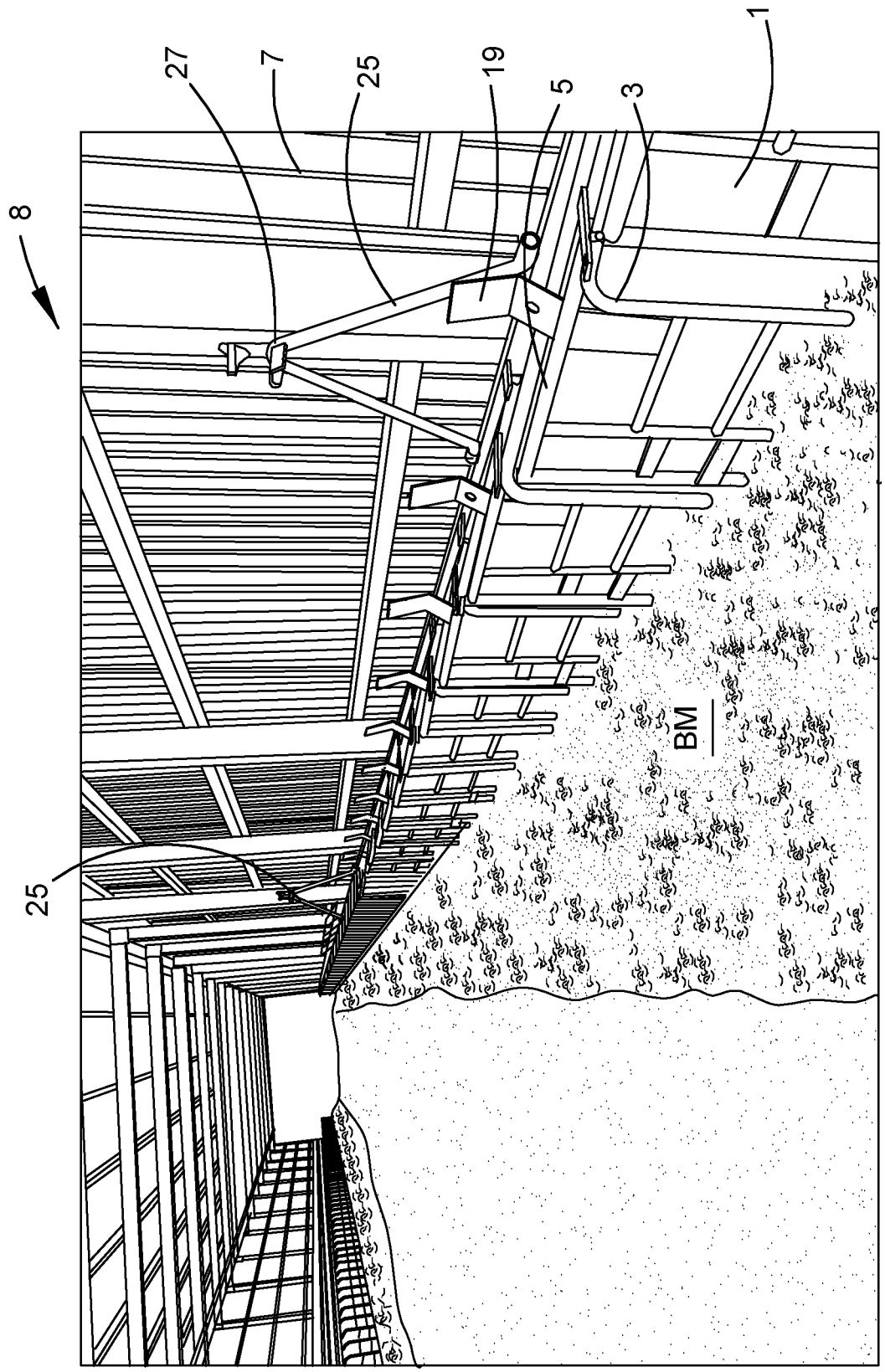
FIG. 6 is a perspective view of an interior of an animal-containment facility.

Utilising preferred forms of the system 1, calves can each have their own pen. On the other hand, the penning system 1 is conveniently collapsible up against the wall 7 whereat it is out of the way to facilitate cleaning. FIG. 6 illustrates an interior of a barn 8 comprising a penning system 1 collapsed against the wall 7 so that most, or preferably substantially all, of the floor areas 13 are exposed without intermediate obstructions. As such, a single large area is presented for cleaning. Conveniently, a vehicle can be driven along the wall 7 to remove the bedding material BM in a single, relatively swift operation. The bedding material can then be laid down with similar relative ease before redeploying the system 1.

A preferred variant of the barn 8 comprises a pair of long walls and a respective system 1 running along each of those walls whereby the two systems 1 sit in opposition to each other. Advantageously, calves can then be conveniently transferred from one side of the barn to the other when it is time to clean the one side of the barn.

Figure 4:
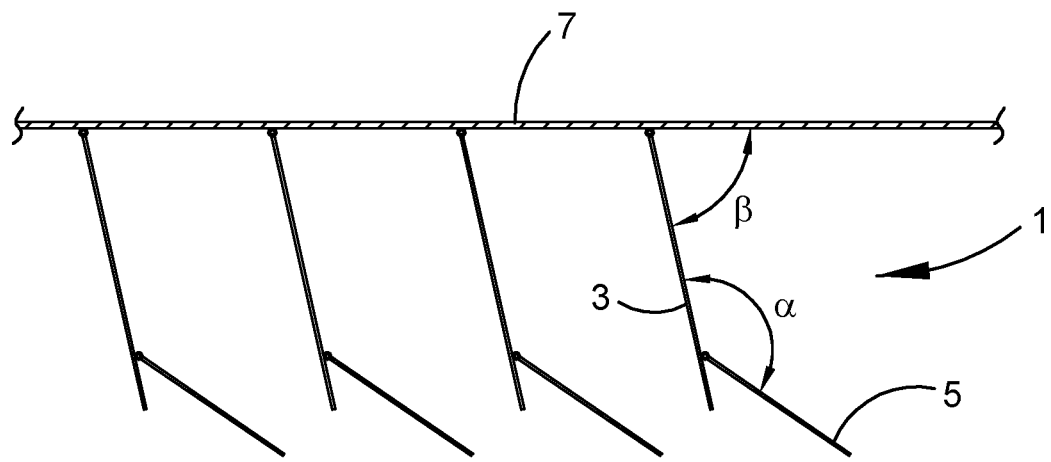
FIG. 4 is a plan view of the system-portion of FIG. 3 transitioning from its deployed configuration to its collapsed configuration.
Figure 5:
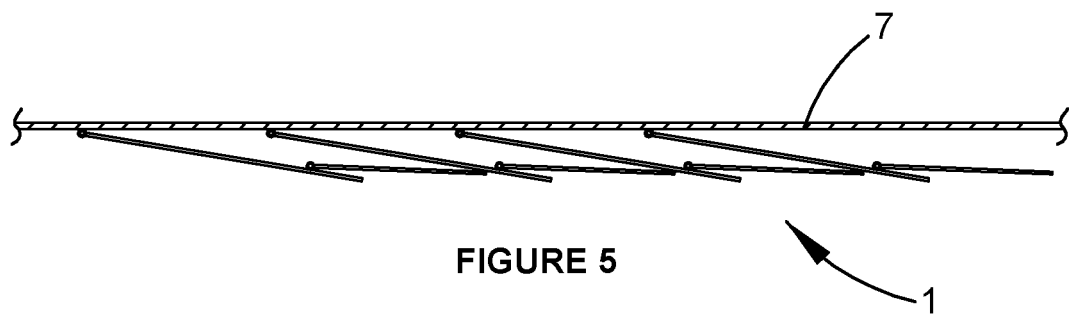
FIG. 5 is a plan view of the system-portion of FIG. 3 in its collapsed configuration.

FIG. 4 illustrates a potential intermediate configuration between the deployed and collapsed configurations in which the mountings 17 have been released and the partitions 3 and barriers 5 swung a small degree from their deployed positions. FIG. 4 is provided to illustrate the geometry of the system and does not reflect the preferred mode of collapse. Preferably the system 1 of FIG. 4 would be collapsed from right to left (as drawn in FIG. 4) by first pivoting the right-most partition-barrier combination 3, 5 so as to open the gate-like barriers 5 (open the angle α) and swing the partition 3 toward the wall 7 (close the angle β). This operation can then be repeated along the sequence of combination 3, 5 until the penning system is collapsed against the wall 7 as illustrated in FIG. 5. Thus the penning system spans a much smaller area, and is in proximity to the wall to clear the way for easier cleaning.

In this example, the axes of the mountings 9, 15, 17 about each pen 13 do not define the vertices of a parallelogram whereby the pen 13 is geometrically constrained when the mounting 17 is engaged. As additional support, the system 1 also comprises drop-down braces 25 each carrying a pair of teeth 27. Each brace 25 is mounted to pivot about a horizontal axis to bring the teeth down to bracket the top rail of a partition 3 and thereby restrain that partition 3 against swinging about its mounting. The braces are spaced along the system 1. Other forms of restraint are possible.

In this particular example, each pen 13 is in the vicinity of 1,500 mm long×1,200 mm wide (W). Beyond the length L (from the wall 7 to the barrier 5), each partition 3 further includes an extension (E) in the vicinity of 250 mm long beyond the barrier 5. This extension provides a visual screen to screen adjacent calves from each other's view and also serves to prevent, for example, one calf to attempting to feed from its neighbour's feed bucket.

Variants of the system 1 may be usefully employed in contexts other than barns. By way of example, a variant of the system 1 may be usefully employed in the context of an open-air sale yard whereat a variant of the system might be installed within an enclosed space. The system might be collapsed to enable the space to be used to contain a large herd as a group, and the system may be deployed to enable the animals to be separated.

The invention is not limited to the examples described herein. Rather, the invention is defined by the claims.

The term 'comprises' and its grammatical variants has a meaning that is determined by the context in which it appears. Accordingly, the term should not be interpreted exhaustively unless the context dictates so.

The invention claimed is:

1. A penning system for an area along an elongate barrier and over a floor, the system comprising:
   movable-barriers;
   partitions which carry the movable-barriers; and
   partition-mountings which mount the partitions to swing about the partition-mountings;
   wherein the partitions and the movable-barriers are movable:
      from a deployed configuration,
         in which the partitions are spaced along the elongate barrier, extend transversely to the elongate barrier, and extend outwardly from the partition-mountings and the elongate-barrier to partition the area into spaces comprising a respective space between each adjacent two of the partitions, and
         the movable-barriers enclose the spaces to define pens for penning animals, each of the pens being defined by the elongate-barrier, two of the partitions and one of the movable-barriers;
      to a collapsed configuration wherein the partitions and movable-barriers are collapsed for cleaning the floor; and
   the partition-mountings cantilever the partitions to hold the partitions and the movable-barriers clear of bedding material and debris on the floor such that the partitions and movable-barriers are supported only by the partition-mountings.

2. The system of claim 1 wherein the partition-mountings are configured to hold the partitions and the movable-barriers in the vicinity of 300 mm clear of the floor.

3. The system of claim 1 comprising supports co-operable with the partitions in the deployed configuration to brace the partitions relative to the elongate-barrier to restrain the partitions against swinging about the partition-mountings.

4. The system of claim 1 wherein each respective movable-barrier has a barrier-mounting to enable the respective movable-barrier to swing relative to a respective one of the partitions adjacent the respective movable-barrier.

5. The system of claim 4 wherein each respective movable-barrier is releasably connectable to another one of the partitions adjacent the respective movable-barrier.

6. The system of claim 1 wherein the animals are calves.

7. An animal-containment facility comprising:
   a floor; and
   one or more penning systems, wherein each of the one or more penning systems is for an area along an elongate barrier and over the floor and comprises:
      movable-barriers;
      partitions which carry the movable-barriers; and
      partition-mountings which mount the partitions to the elongate barrier such that the partitions swing about the partition-mountings;
   wherein the partitions, and the movable-barriers, of each of the one or more penning systems are movable:
      from a deployed configuration,
         in which the partitions are spaced along the elongate barrier, extend transversely to the elongate barrier, and extend outwardly from the partition-mountings and the elongate-barrier to partition the area into spaces comprising a respective space between each adjacent two of the partitions, and
         the movable-barriers enclose the spaces to define pens for penning animals, each of the pens being defined by the elongate-barrier, first and second ones of the partitions and at least one of the movable-barriers;
      to a collapsed configuration wherein the partitions and movable-barriers are collapsed for cleaning the floor; and
   the partition-mountings of each of the one or more penning systems are configured to cantilever the partitions to hold the partitions and the movable-barriers clear of bedding material and debris on the floor such that the partitions and movable-barriers are supported only by the partition-mountings.

8. The facility of claim 7 comprising bulk material covering at least most of the floor within the area.

9. The facility of claim 7 comprising:
   a first penning system of the one or more penning systems; and
   a second penning system of the one or more penning systems.

10. The facility of claim 9 wherein the partitions of the first penning system are spaced along a first elongate barrier and the partitions of the second penning system are spaced along a second elongate barrier substantially opposite to the first elongate barrier.

11. The animal containment facility of claim 7 wherein:
   the partition-mountings of each of the one or more penning systems cantilever the partitions, in each of the deployed configuration and the collapsed configuration, to hold the partitions and the movable-barriers clear of bedding material and debris on the floor; and
   at least one of the one or more penning systems is in the deployed configuration and has animals in the pens of the penning system.

12. A method comprising:
   maintaining an animal-containment facility, the facility comprising a floor and one or more penning systems, wherein each of the one or more penning systems is for an area along an elongate barrier and over the floor and comprises:

movable-barriers;
partitions which carry the movable-barriers; and
partition-mountings attached to the elongate barrier, which mount the partitions to swing about the partition-mountings, and
wherein the partitions, and the movable-barriers, of each of the one or more penning systems are movable:
   from a deployed configuration,
      in which the partitions are spaced along the elongate barrier, extend transversely to the elongate barrier, and extend outwardly from the partition-mountings and the elongate-barrier to partition the area into spaces comprising a respective space between each adjacent two of the partitions, and
      the movable-barriers enclose the spaces to define pens for penning animals, each of the pens being defined by the elongate-barrier, two of the partitions and one of the movable-barriers;
   to a collapsed configuration wherein the partitions and movable-barriers are collapsed for cleaning the floor; and
wherein the partition-mountings of each of the one or more penning systems cantilever the partitions to hold the partitions and the movable-barriers clear of bedding material and debris on the floor, such that the partitions and movable-barriers are supported only by the partition-mountings;
the method comprising in connection with a penning system of the one or more penning systems:
removing animals from the pens;
collapsing the partitions and the movable-barriers to the collapsed configuration; and
cleaning the floor.

13. The method of claim 12, wherein the facility comprises a first penning system of the one or more penning systems and a second penning system of the one or more penning systems, and the method comprises:
   transferring the animals from the first penning system to the second penning system;
   collapsing the partitions and the movable-barriers of the first penning system to the collapsed configuration; and
   cleaning the floor in a vicinity of the first penning system.

14. The method of claim 12 wherein the cleaning comprises removing the bedding material.

15. The method of claim 12 wherein each of the animals has its own one of the pens.

16. The method of claim 12 wherein the animals are calves.

17. The method of claim 12 wherein, prior to the removing:
   the penning system is in the deployed configuration while:
      the partition-mountings of the penning system cantilever the partitions of the penning system to hold the partitions and the movable-barriers of the penning system clear of bedding material and debris on the floor; and
      the animals are in the pens of the penning system.

18. The method of claim 13 wherein the partitions of the first penning system are spaced along a first elongate barrier and the partitions of the second penning system are spaced along a second elongate barrier substantially opposite to the first elongate barrier.

19. The method of claim 12 wherein the collapsing comprises swinging the partitions in the same direction about the partition-mountings.

* * * * *